(No Model.)
W. D. SMITH.
VELOCIPEDE.
No. 597,073. Patented Jan. 11, 1898.
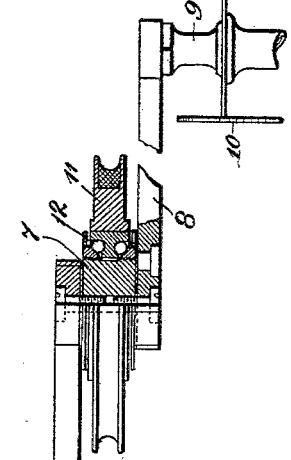
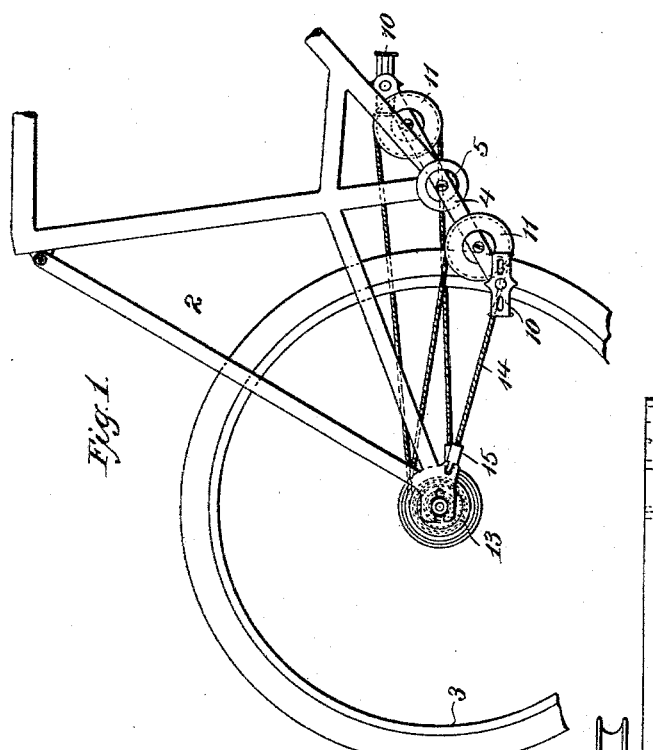
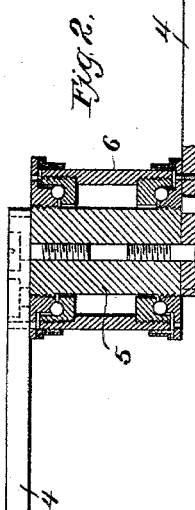
Fig.1.
Fig.2.
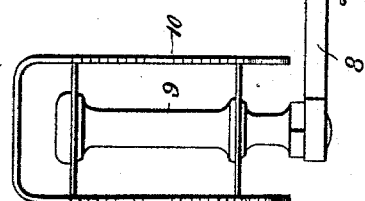
WITNESSES:
Harry S. Rohrer
C. Byrnes.
INVENTOR
W. D. Smith

UNITED STATES PATENT OFFICE.

WILLIAM D. SMITH, OF DENVER, COLORADO.

VELOCIPEDE.

SPECIFICATION forming part of Letters Patent No. 597,073, dated January 11, 1898.

Application filed April 26, 1897. Serial No. 633,885. (No model.)

*To all whom it may concern:*

Be it known that I, WILLIAM D. SMITH, of Denver, in the county of Arapahoe, State of Colorado, have invented a new and useful Improvement in Velocipedes, of which the following is a full, clear, and exact description, reference being had to the accompanying drawings, forming part of this specification, in which—

Figure 1 is a side elevation of a portion of a bicycle having driving-gear constructed in accordance with my invention, and Fig. 2 is a horizontal section of the driving mechanism.

My invention relates to the driving of safety-bicycles, and is designed to provide a construction whereby rotary cranks may be employed in connection with clutches on the driving-wheel. Flexible connections have heretofore been employed extending between oscillatory levers and oscillatory drums having clutches arranged to drive the rear wheel, but I believe myself the first to devise practical means for applying such flexible connections to cranks which move in a rotary path.

To that end my invention consists in providing rotary cranks upon each of which is mounted a pulley over which a flexible connection extends from a stationary point back to a corresponding oscillatory drum and clutch and in providing the crank with a pedal-arm which extends beyond the pulley, this pedal-arm being provided with a pedal which is outside the plane of rotation of the crank and of the pulley.

In the drawings, 2 represents the frame of the bicycle, which frame may be made with little or no variation from the present construction.

3 is the driven wheel, and 4 4 are rotary cranks secured at their inner ends to a crank-shaft 5, which is journaled in a hanger 6 and is provided with suitable ball-bearings, as shown. At the outer end of each crank is provided a hub or axle 7, extending at right angles to the crank, and to the outer end of which is secured a pedal-arm 8, having at its outer end a right-angled axle or hub 9 for the pedal 10. On the hub 7 of each crank is mounted a pulley 11, which is preferably provided with ball-bearings 12, as shown. Upon the axle of the rear wheel and at each side of such wheel are mounted oscillatory drums and clutches 13, and to each of these drums is secured a flexible connection 14, consisting, preferably, of a wire rope which extends from the drum forwardly over the corresponding pulley upon the crank-arm and thence rearwardly to a point, such as 15, on the frame, where its end is secured.

The clutch-drums may be reversely operated by means of the usual springs contained in them or by any other suitable means, and it is evident that as the cranks are moved through a rotary path the drums will be oscillated alternately with a multiplying motion on account of the flexible connection extending over the pulleys on the cranks to stationary points. This multiplying action is an essential feature of the combination, since it enables the machine to be geared sufficiently high to make it a practical success, and I consider myself the first to attain this result by means located on the rotary cranks themselves, thus giving a simple and effective construction instead of the complicated multiplying-gearing heretofore employed in the rear hub wherever rotary cranks have been used in connection with the clutches.

The advantages of my invention are numerous. By placing the multiplying-pulley upon the rotary crank and extending the pedal-arm from the crank to a point beyond the pulley I am enabled to obtain a high gear, while the distance from the center of rotation of the crank to the pedal is not increased and the pulley and rope are so located that they will not interfere with the movement of the foot upon the pedal. The great amount of friction consequent upon the use of multiplying-gearing is almost entirely done away with, and the device is simple and effective and in practice has proved a complete success.

Many changes in the shape of the crank, the pedal-arm, and other parts may be made without departing from my invention, since,

What I claim is—

1. Driving-gear for bicycles or similar vehicles, comprising a rotary crank carrying a pulley at one side of the crank-axis, a driven wheel having an oscillatory drum and clutch, a flexible connection attached at a stationary point and passing thence over the pulley to the drum, and means for reversely operating the drum.

2. Driving-gear for bicycles or similar vehicles, comprising a rotary crank carrying a pulley at one side of the crank-axis, a pedal-arm extending from the crank and carrying a pedal, a driven wheel having an oscillatory drum and clutch, a flexible connection secured at a stationary point and passing thence over the pulley to the drum and clutch, and means for reversely operating the drum.

3. Driving-gear for bicycles and similar vehicles, comprising a rotary crank carrying a pulley at a point outside the crank-axis, a pedal-arm extending from the crank, a pedal mounted on the pedal-arm and outside of the plane of rotation of the crank, a driven wheel having an oscillatory drum and clutch, a flexible connection attached at a stationary point and passing thence over the pulley to the drum, and means for reversely operating the drum.

In testimony whereof I have hereunto set my hand.

WILLIAM D. SMITH.

Witnesses:
H. M. CORWIN,
GEORGE I. HOLDSHIP.